(12) United States Patent
Jornod et al.

(10) Patent No.: US 12,092,473 B2
(45) Date of Patent: Sep. 17, 2024

(54) METHOD, COMPUTER PROGRAM, APPARATUS, VEHICLE, AND NETWORK ENTITY FOR PREDICTING A DEADLOCK SITUATION FOR AN AUTOMATED VEHICLE

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE); Israel Gonzalez Vazquez, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 140 days.

(21) Appl. No.: 17/182,322

(22) Filed: Feb. 23, 2021

(65) Prior Publication Data
US 2021/0262813 A1    Aug. 26, 2021

(30) Foreign Application Priority Data
Feb. 26, 2020  (EP) .................................... 20159588

(51) Int. Cl.
*G01C 21/34* (2006.01)
*G06Q 10/083* (2024.01)

(52) U.S. Cl.
CPC ..... *G01C 21/3492* (2013.01); *G01C 21/3415* (2013.01); *G06Q 10/083* (2013.01)

(58) Field of Classification Search
CPC ............ G01C 21/3492; G01C 21/3415; G06Q 10/083; G05D 1/00; G05D 1/02;
(Continued)

(56) References Cited

U.S. PATENT DOCUMENTS 9,201,421 B1 *  12/2015  Fairfield ................. G06V 20/58
9,257,041 B2 *   2/2016  Scofield ............... G08G 1/0104
(Continued)

FOREIGN PATENT DOCUMENTS

CN       109360421 A      2/2019
DE    102015118489 A1     5/2016
(Continued)

OTHER PUBLICATIONS

Office Action for Korean Patent Application No. 10-2021-0023441; Jan. 18, 2022.
(Continued)

*Primary Examiner* — Anne Marie Antonucci
*Assistant Examiner* — Misa H Nguyen
(74) *Attorney, Agent, or Firm* — Barnes & Thornburg LLP

(57) ABSTRACT

A method, a computer program, an apparatus, a transportation vehicle, and a network entity for predicting a deadlock situation for an automated transportation vehicle. The deadlock situation is an exceptional traffic situation necessitating a change of an operational mode of the transportation vehicle. The method for predicting a deadlock situation for the automated transportation vehicle includes obtaining information related to a historical deadlock situation cause, determining historical context information for the historical deadlock situation cause, determining information indicative for the deadlock situation cause based on the information related to the historical context information, monitoring actual context information for information indicative for the deadlock situation, and predicting the deadlock situation based on the information indicative for the deadlock situation in the actual context information.

28 Claims, 2 Drawing Sheets

(58) Field of Classification Search
CPC ......... G05D 1/0221; G05D 2201/0213; G05D 1/0027; G05D 1/0011; B60W 50/0097; B60W 60/0059; B60W 40/04; B60W 30/18018; B60W 60/00256; B60W 2050/0064; B60W 2300/12; B60Y 2200/14; B60Y 2300/18016
See application file for complete search history.

(56) References Cited

U.S. PATENT DOCUMENTS

| | | | |
|---|---|---|---|
| 9,494,935 | B2 | 11/2016 | Okumura et al. |
| 9,507,346 | B1* | 11/2016 | Levinson ............. G05D 1/0291 |
| 10,133,270 | B2 | 11/2018 | Michalakis et al. |
| 10,745,016 | B2 | 8/2020 | Bae et al. |
| 10,877,481 | B2 | 12/2020 | You et al. |
| 11,036,220 | B2 | 6/2021 | Katou et al. |
| 2003/0004780 | A1* | 1/2003 | Smith ................ G06Q 30/0252 705/14.5 |
| 2011/0043377 | A1 | 2/2011 | McGrath et al. |
| 2015/0149017 | A1 | 5/2015 | Attard et al. |
| 2016/0042321 | A1* | 2/2016 | Held ................ G06Q 10/08355 705/338 |
| 2017/0069209 | A1* | 3/2017 | Beaurepaire ..... G08G 1/096811 |
| 2017/0161614 | A1* | 6/2017 | Mehta ..................... G06N 20/00 |
| 2018/0231978 | A1 | 8/2018 | Li et al. |
| 2018/0365908 | A1 | 12/2018 | Liu et al. |
| 2019/0163176 | A1 | 5/2019 | Wang et al. |
| 2019/0204830 | A1 | 7/2019 | Ogura |
| 2019/0294160 | A1 | 9/2019 | Shintani et al. |
| 2019/0303866 | A1* | 10/2019 | Baik ................ G06Q 10/08355 |
| 2020/0004240 | A1 | 1/2020 | Biehler et al. |
| 2020/0041997 | A1 | 2/2020 | Tuukkanen et al. |
| 2021/0095985 | A1* | 4/2021 | Zhao ....................... G06F 16/27 |

FOREIGN PATENT DOCUMENTS

| | | |
|---|---|---|
| DE | 102015015833 A1 | 6/2017 |
| DE | 102018106527 A1 | 10/2018 |
| DE | 102017213204 A1 | 2/2019 |
| JP | 2002286473 A | 10/2002 |
| JP | 2015227852 A | 12/2015 |
| KR | 20130090153 A | 8/2013 |
| KR | 20180112949 A | 10/2018 |
| KR | 20180119379 A | 11/2018 |
| KR | 20190007287 A | 1/2019 |
| WO | 2018079028 A1 | 5/2018 |

OTHER PUBLICATIONS

Written Opinion for Korean Patent Application No. 10-2021-0023441; Feb. 23, 2022.

Search Report for European Patent Application No. 20159588.1; Jul. 7, 2020.

Office Action; Chinese Patent Application No. 202110216748.5; Nov. 27, 2023.

* cited by examiner

METHOD, COMPUTER PROGRAM, APPARATUS, VEHICLE, AND NETWORK ENTITY FOR PREDICTING A DEADLOCK SITUATION FOR AN AUTOMATED VEHICLE

PRIORITY CLAIM

This patent application claims priority to European Patent Application No. 20159588.1, filed 26 Feb. 2020, the disclosure of which is incorporated herein by reference in its entirety.

SUMMARY

Illustrative embodiments relate to a method, a computer program, an apparatus, a transportation vehicle, and a network entity for predicting a deadlock situation for an automated transportation vehicle, more specifically, but not exclusively, to a concept for delay compensation in tele-operated driving.

BRIEF DESCRIPTION OF THE DRAWINGS

Disclosed embodiments will be described in more detail with reference to the accompanying figures, in which.

DETAILED DESCRIPTION

Figure 1:
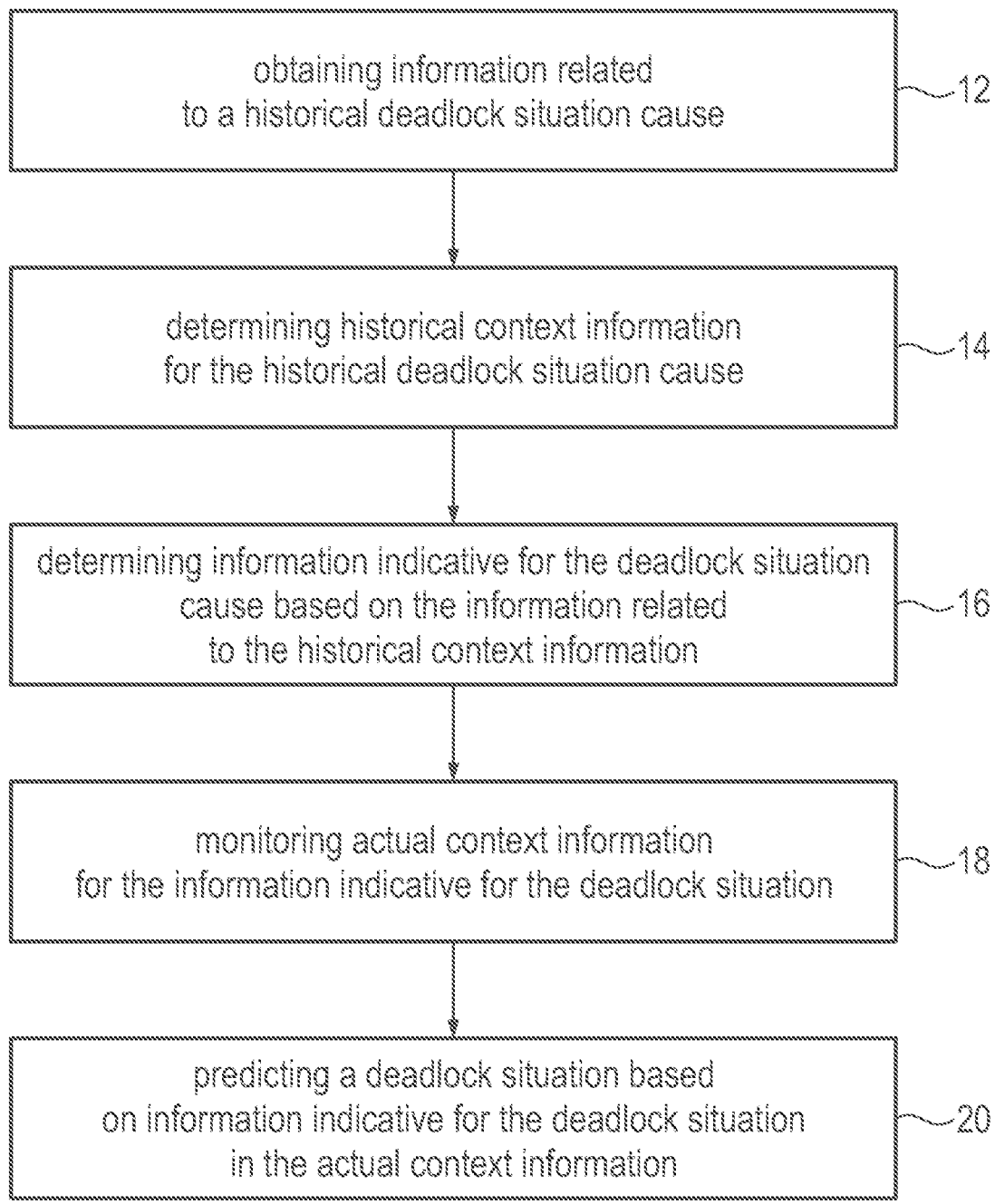
FIG. 1 illustrates a block diagram of an exemplary embodiment of a method for predicting a deadlock situation for an automated transportation vehicle.

Vehicular communication is a field of research and development. To enable an autonomous or semi-autonomous driving of transportation vehicles, transportation vehicles are expected to use Vehicle-to-Vehicle-communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

Tele-operated driving (ToD) is getting more and more interest. The main concept of ToD is an automated vehicle (AV) remotely driven by a control/command center (CC). CC and AV may be far away from each other. They are connected via a radio communication system (e.g., 4th, 5th Generation mobile communication systems (4G, 5G)) and its backhaul. Therefore, a certain end-to-end (E2E) delay is to be expected. The CC controls the automated vehicle (AV) via remote control, directly or indirectly. In indirect control, a proposed path (trajectory) is sent to the AV, whereas in direct control the CC directly controls one or more actuators of the AV. In both cases, the E2E delay from the CC to the AV may be considered when the CC is planning a path for the transportation vehicle or when steering the transportation vehicle.

ToD might become a key technology to solve issues with L4/L5 (high automation/full automation) driven transportation vehicles, such as interpretation issues or deadlocks. Transportation vehicles use their onboard sensor systems to model and interpret their surroundings and environment. With the given high standards of safety and reliability, situations may occur, which cannot be interpreted or resolved with sufficient reliability anymore. These issues occur when automatic driven vehicles (AV) are not able to interpret and solve a situation due to unclear traffic conditions, e.g., an accident or a construction site, or in general low confidence levels of detected objects. These situations are also referred to as deadlocks. A transportation vehicle in a deadlock situation may need external instructions from someone else to solve the situation. One option is manual operation by a driver if available and another option is operation of a so-called control center (CC) offering ToD services. A ToD operated transportation vehicle will be driven remotely from the CC in what is called a ToD session.

Document DE 10 2015 118 489 A1 describes computer devices, systems, and methods for remote control of an autonomous passenger transportation vehicle. If an autonomous transportation vehicle is in an unexpected environment, such as a road construction site or an obstacle that is unsuitable for autonomous operation, the transportation vehicle sensors can collect data about the transportation vehicle and the unexpected environment, including images, radar and LIDAR data, etc. The captured data can be sent to a remote operator. The remote operator can manually operate the transportation vehicle remotely or give instructions to the autonomous transportation vehicle to be executed by various vehicle systems. The captured data sent to the remote operator can be optimized to save bandwidth, such as by sending a limited subset of the captured data.

Document DE 10 2018 106 527 A1 discloses an electronic control unit for a transportation vehicle for switching transportation vehicle control from an autonomous driving mode. The control unit includes one or more processors, network interface hardware configured to communicate with a remote server over a network, and one or more memory modules that store logic. The electronic control unit executes logic to determine that the autonomous driving mode of the transportation vehicle will terminate, determine that a driver is unavailable to take immediate control of the transportation vehicle upon termination of the autonomous driving, transfer control of the transportation vehicle to a remote operator over the network interface hardware for a first time period, generate an alert to the driver to take manual control of the transportation vehicle, and transfer control of the transportation vehicle to one of the driver and the autonomous driving mode after the first time period has elapsed.

Document US 2019/0163176 A1 discloses a concept for transferring control of an autonomous transportation vehicle to a remote operator.

Document US 2019/204830 A1 discloses an abnormality predicting device for a transportation vehicle and for predicting an abnormality of an occupant of the transportation vehicle and predicting an abnormality of a vehicle part.

Document US 2015/149017 A1 discloses a concept for identifying a vehicle operator of a transportation vehicle and determining one or more parameters specifying a mode for autonomously operating the transportation vehicle.

There is a demand for an improved concept with respect to resolving deadlock situations for automated transportation vehicles.

Disclosed embodiments are based on the finding that deadlock situations for automated transportation vehicles can be predicted. Such prediction can be based on analysis of historical deadlock data, e.g., based on determining what are the causes of deadlock situations to occur. Further, the actual and historical context situation of such deadlock causes can be analyzed, e.g., in terms of correlation with other factors, such as environmental factors, time factors, other circumstances and conditions. Such correlations can then be used to determine information that can be used as a trigger or indicator for deadlock situations. By monitoring actual context information and detecting information indicative for the deadlock situation in the actual context information, future deadlock situations can be predicted or at least circumstances indicating a high probability for a deadlock situation can be detected/predicted. Such information can also be used to generate a map with predicted deadlock situations. Being able to reliably predict occurrence of a deadlock situation enables a better resource planning for ToD needs. For example, if it is known that tomorrow there will be a high probability of many deadlock situations, more personnel (remote drivers) may be planned in a ToD command center.

Disclosed embodiments provide a method for predicting a deadlock situation for an automated transportation vehicle. The deadlock situation is an exceptional traffic situation necessitating a change of an operational mode of the transportation vehicle. The method comprises obtaining information related to a historical deadlock situation cause and determining historical context information for the historical deadlock situation cause. The method further comprises determining information indicative for the deadlock situation cause based on the information related to the historical context information, and monitoring actual context information for the information indicative for the deadlock situation. The method further comprises predicting the deadlock situation based on the information indicative for the deadlock situation in the actual context information. Disclosed embodiments may enable a prediction of a deadlock situation.

For example, the historical context information may comprise information on a spatial distribution seasonality of a deadlock situation. The spatial distribution seasonality may enable a more reliable prediction of deadlock situations.

In some exemplary embodiments the deadlock situation may be a traffic jam, the information on the historical deadlock situation cause may be an increased traffic density, and the historical context information may comprise at least one element of the group of a rush hour daytime, a rush hour business day, and a rush hour holiday. The actual context information may comprise at least one element of the group of an actual daytime, a date, and whether a day is a holiday. Situations of increased traffic density/jams may be determined, and their context may be analyzed, e.g., with respect to time, date and other circumstances under which they may occur. Disclosed embodiments may then enable a reliable prediction of such situations based on repetitive context information.

The information indicative for the deadlock situation may be a predicted rush hour. Disclosed embodiments may use the information that the probability for a deadlock situation to occur is higher during a rush hour.

The deadlock situation may be a street-blocking truck in a further exemplary embodiment. The information on the historical deadlock situation cause may be a moving activity and the historical context information may comprise at least one element of the group of seasonal moving activities, moving rates, and official road blocking authorizations for moving trucks. Disclosed embodiments may exploit knowledge about seasonal moving activities, moving rates, or official road blocking authorizations for moving trucks to predict deadlock situations with a higher confidence.

For example, the deadlock situation may be a street-blocking truck and the information on the historical deadlock situation cause may be goods delivery. The historical context information may comprise at least one element of the group of periodical delivery of goods, a delivery schedule of a truck, and a delivery schedule of a packet delivery service. Some exemplary embodiments may benefit form information related to periodical delivery of goods, a delivery schedule of a truck, and/or a delivery schedule of a packet delivery service to predict deadlock situations. The information indicative for the deadlock situation may be a predicted delivery.

In further exemplary embodiments the deadlock situation may be a traffic jam. The information on the historical deadlock situation cause may be an increased traffic density and the historical context information may comprise an event schedule. The event may be a sports event, a music event, and/or a political event and the information indicative for the deadlock situation may be a predicted event. Disclosed embodiments may consider scheduled events for the prediction of deadlock situations and more reliably predict deadlocks evoked by such events.

The deadlock situation may be a false alarm for an object detected on the route of the transportation vehicle. There are multiple circumstances, which may contribute to or provoke false object detection. For example, the information on the historical deadlock situation cause may be a weather event. The historical context information may comprise at least one element of the group of historical weather data and a false detection rate depending on weather events. Information about forthcoming weather events may be used in some exemplary embodiments to further improve the reliability of the prediction. The weather event may comprise wind speeds higher than a predefined threshold. The higher wind speeds may indicate that more objects will be moved next to the ground, e.g., plastic bags or leaves, which may cause false object detections by vehicular sensors.

Disclosed embodiments further provide a computer program having a program code for performing one or more of the described methods, when the computer program is executed on a computer, processor, or programmable hardware component. A further exemplary embodiment is a computer readable storage medium storing instructions, which, when executed by a computer, processor, or programmable hardware component, cause the computer to implement one of the methods described herein.

Disclosed embodiments further provide an apparatus for predicting a deadlock situation for an automated transportation vehicle. The deadlock situation is an exceptional traffic situation necessitating a change of an operational mode of the transportation vehicle. The apparatus comprises one or more interfaces for communicating with one or more network entities. The apparatus further comprises a control module configured to carry out one of the methods described herein. Another disclosed embodiment is a transportation vehicle comprising an exemplary embodiment of the apparatus and yet another exemplary embodiment is a network entity comprising an exemplary embodiment of the apparatus.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular exemplary embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for predicting a deadlock situation for an automated transportation vehicle. The deadlock situation is an exceptional traffic situation necessitating a change of an operational mode of the transportation vehicle. For example, the transportation vehicle is in L4 or L5 of automated driving, but the situation detected by the transportation vehicle does not allow continuing in this driving mode. Reasons for this need may be that an interpretation of the situation is too uncertain, e.g., whether an object is in the way, or whether a path to get around a blocking object is safe. Therefore, more human interaction or support by an entity having more information on the situation may be required to resolve the situation, i.e., to guide the transportation vehicle out of the situation.

As shown in FIG. 1 the method 10 comprises obtaining 12 information related to a historical deadlock situation cause. Such information can be obtained from statistics. For example, data may be collected/logged over time and analyzed. The method 10 further comprises determining 14 historical context information for the historical deadlock situation cause. Hence, the analysis may include determining correlations or conditional relations in the historical context information, between historical deadlock situations and historical deadlock situation causes. The method 10 further comprises determining 16 information indicative for the deadlock situation cause based on the information related to the historical context information. Such indicative information may comprise triggers or indications in the historical context information that would have allowed to predict the deadlock situation. The method 10 then comprises monitoring, scanning or searching 18 actual context information for the information indicative for the deadlock situation. The indicators determined for the historical deadlock situation may then be applied to actual or present context information. The method 10 further comprises predicting 20 a deadlock situation based on the information indicative for the deadlock situation in the actual context information.

The actual and historical context information may comprise any information representing outer circumstances or conditions, e.g., any information relating to weather, time, traffic, road type, etc. Such information may be retrieved from transportation vehicles sensing their environment over time.

Figure 2:
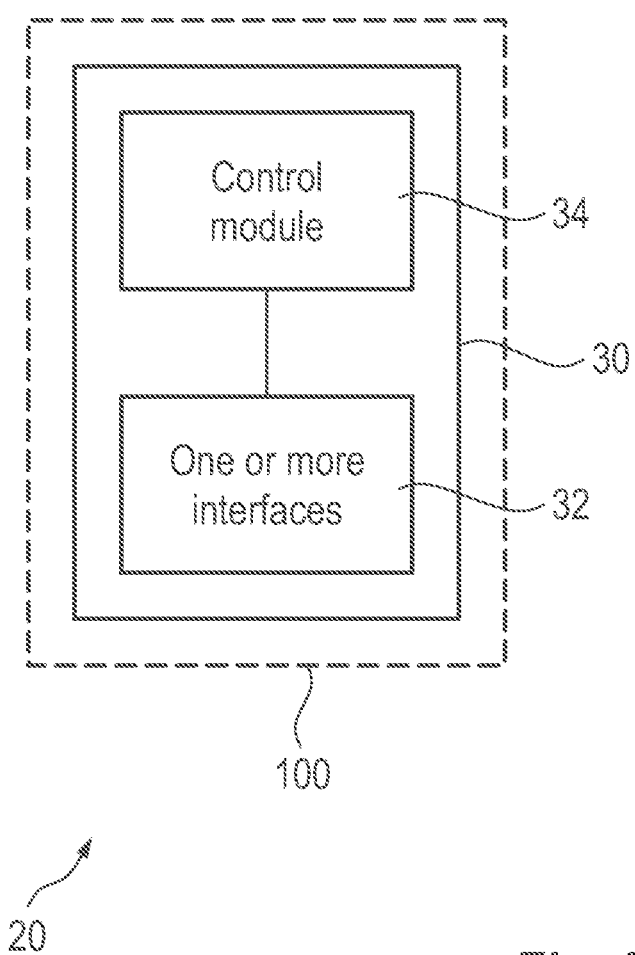
FIG. 2 illustrates block diagrams of exemplary embodiments for an apparatus for predicting a deadlock situation for an automated transportation vehicle and for a transportation vehicle or a network entity.

FIG. 2 illustrates block diagrams of exemplary embodiments for an apparatus 30 for predicting a deadlock situation for an automated transportation vehicle 100, and for the transportation vehicle 100 or a network entity 100. The apparatus 30 for predicting a deadlock situation for an automated transportation vehicle comprises one or more interfaces 32 for communicating with one or more network entities, e.g., servers, transportation vehicles, etc. The apparatus 30 further comprises a control module 34, which is coupled to the one or more interfaces and which is configured to carry out one of the methods 10 described herein. FIG. 2 further shows an exemplary embodiment of a transportation vehicle 100 or a network entity 100 comprising an exemplary embodiment of the apparatus 30.

In disclosed embodiments the one or more interfaces 32 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32 may comprise further components to enable according communication a system, e.g., a mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32 may be coupled to one or more antennas, which may correspond to any transmit and/or receive antennas, such as horn antennas, dipole antennas, patch antennas, sector antennas etc. In some examples the one or more interfaces 32 may serve the purpose of transmitting or receiving or both, transmitting and receiving, information, such as information, input data, control information, further information messages, etc.

As shown in FIG. 2 the respective one or more interfaces 32 are coupled to the respective control module 34 at the apparatus 30. In disclosed embodiments the control module 34 may be implemented using one or more processing units, one or more processing devices, any method or mechanism for processing, such as a processor, a computer or a programmable hardware component being operable with accordingly adapted software. In other words, the described functions of the control module 34 may as well be implemented in software, which is then executed on one or more programmable hardware components. Such hardware components may comprise a general-purpose processor, a Digital Signal Processor (DSP), a micro-controller, etc.

In disclosed embodiments, communication, i.e., transmission, reception or both, may take place among mobile transceivers/transportation vehicles 100 directly, e.g., forwarding input data or control information to/from a control center. Such communication may make use of a mobile communication system. Such communication may be carried out directly, e.g., by Device-to-Device (D2D) communication and may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p. 3GPP (3rd Generation Partnership Project) systems (4th generation (4G), 5G, New Radio (NR) and beyond), etc.

In disclosed embodiments a transportation vehicle may correspond to any conceivable method or mechanism for transportation, e.g., a car, a bike, a motorbike, a van, a truck, a bus, a ship, a boat, a plane, a train, a tram, etc. The method 10 as described above may be carried out at a transportation vehicle or network entity 100. A network entity may be any server, computer, base station, controller implemented in the network. For example, the network entity may be collocated with or in close communication with a control/command center for ToD. That way, resource planning at the control/command center may be enhanced through the prediction of deadlock situations for automated transportation vehicles.

For example, exemplary embodiments may provide a method 10 for predicting deadlock situations for teleoperated driving. Some deadlock situations can be predicted using prior knowledge (historical information) and gathered in predicted deadlock maps. Such a map may be street or road map with overlaid indicators for expected deadlock situations, e.g., with indications of probabilities for deadlock situations to occur. Such a map may further have a time component, e.g., some deadlock situation may have significant probabilities for certain times only, such as during rush hours.

In some exemplary embodiments the method 10 may further comprise generating a predicted deadlock map based on the actual context information. Disclosed embodiments may predict deadlocks using analysis of historical deadlock situations. Indeed, in some exemplary embodiments a spatial seasonality of some deadlock events may be used to predict future events. The historical context information may comprise information on a spatial distribution seasonality of a deadlock situation.

For example, traffic jams may create unknown or uncertain situations at traffic lights during rush hours (on business day, holidays etc.). The deadlock situation may be a traffic jam and the information on the historical deadlock situation cause may be an increased traffic density. The historical context information may hence comprise at least one element of the group of a rush hour daytime, a rush hour business day, and/or a rush hour holiday. The actual context information may comprise at least one element of the group of an actual daytime, a date, and whether a day is a holiday. Accordingly, the information indicative for the deadlock situation may be a predicted rush hour, which in turn strongly correlates with the other factors, e.g., time of day during a business day.

Moreover, there is a seasonality in the amount of people moving (in or out), several statistics are available, which indicate that there are more moving activities during the summer month than during the winter month. An example can be found under https://www.atlasvanlines.com/infographics/seasonality-of-moving Moving (in or out) might involve a truck blocking a street. Additionally, in most cities, blocking the street with a moving truck requires a specific authorization. This data could be used to precisely update the map in disclosed embodiments. For example, the deadlock situation is a street-blocking truck. The information on the historical deadlock situation cause may be a moving activity and the historical context information may comprise at least one element of the group of seasonal moving activities, moving rates, and official road blocking authorizations for moving trucks.

In another exemplary embodiment the deadlock situation is also a street-blocking truck. The information on the historical deadlock situation cause is goods delivery and the historical context information comprises at least one element of the group of periodical delivery of goods, a delivery schedule of a truck, and a delivery schedule of a packet delivery service. Delivery trucks generally operate on a specific schedule. If a deadlock pattern is detected in a region, an exemplary embodiment can predict the future occurrence of deadlocks created by these delivery trucks. The information indicative for the deadlock situation is then a predicted delivery. Another similar example is a garbage collection truck, which may also cause deadlock situations. Routes of garbage collection trucks may follow schedules, which can be accessed for the prediction in some disclosed embodiments.

In a further exemplary embodiment public data regarding large scale events that block specific streets can be used to update the deadlock probability map (football match, protest etc.). The deadlock situation may then be a traffic jam and the information on the historical deadlock situation cause may be an increased traffic density. The historical context information comprises an event schedule. A more global update can also be foreseen when it comes to predicted events with no specific location, such as illegal protest (e.g., Yellow Jackets in Paris, every Saturday, with no specific protest plan). In exemplary embodiments the event may be a sports event, a music event, or a political event, and the information indicative for the deadlock situation may be a predicted event.

Another source of deadlock is false positive for objects detections. One example is a flying plastic bag or branch on the street. These events can be linked with the direction and force of the wind, which is also an available data. Disclosed embodiments may first study the impact of the wind on deadlocks situation. Disclosed embodiments may then predict a general higher probability of deadlock from wind-based events. The deadlock situation may then be a false alarm for an object detected on the route of the transportation vehicle. The information on the historical deadlock situation cause may be a weather event. The historical context information may then comprise at least one element of the group of historical weather data and a false detection rate depending on weather events. The weather event may comprise wind speeds higher than a predefined threshold, a thunderstorm, a blizzard, road ice, etc.

For example, deadlock situations may occur with a higher probability during thunderstorms or heavy rain or other weather phenomena which may impair sensor detection of the environment. Some exemplary embodiments may hence use weather forecast information to predict deadlock situation in a certain area. Such prediction can be based on the knowledge that from the historical data a correlation can be determined between such a weather phenomenon and the deadlock situation. For example, dropped branches can be predicted on the road surface of an alley during/after heavy winds, repetitive floods can be observed on certain roads after heavy rain, and repetitive accidents happen on certain road sections after road ice.

As already mentioned, in disclosed embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the methods described herein or (field) programmable logic arrays ((F)PLAs) or (field) programmable gate arrays ((F)PGAs), programmed to perform the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 method for predicting a deadlock situation for an automated transportation vehicle
12 obtaining information related to a historical deadlock situation cause
14 determining historical context information for the historical deadlock situation cause
16 determining information indicative for the deadlock situation cause based on the information related to the historical context information
18 monitoring actual context information for information indicative for the deadlock situation
20 predicting the deadlock situation based on the information indicative for the deadlock situation in the actual context information
30 apparatus for predicting a deadlock situation for an automated transportation vehicle
32 one or more interfaces
34 control module
100 transportation vehicle/network entity

The invention claimed is:

1. An apparatus for controlling a present mode of operation of an automated transportation vehicle based on prediction of a future deadlock situation for the automated transportation vehicle, wherein the predicted future deadlock situation is an exceptional traffic situation necessitating a change of the present operational mode for operation of the automated transportation vehicle from automated operation of the automated transportation vehicle to a tele-operated operation of the automated transportation vehicle from a control center, wherein the exceptional traffic situation would be insurmountable when in automated operation of the automated transportation vehicle, wherein the exceptional traffic situation would result from conditions resulting from the predicted future deadlock situation for the automated transportation vehicle, the apparatus comprising:

one or more interfaces for communicating with one or more network entities; and a control module configured to:
obtain information related to a historical deadlock situation cause in proximity to a present location of the automated transportation vehicle;

obtain determined historical context information for the historical deadlock situation cause in proximity to the present location of the automated transportation vehicle;

obtain determined information indicative of the historical deadlock situation cause based on the historical context information;

monitor present context information for present information that corresponds to the determined information indicative of the historical deadlock situation cause at the present location of the automated transportation vehicle;

obtain information including a predicted future deadlock situation based on the monitoring identifying a presence of present information that corresponds to the determined information indicative of the historical deadlock situation cause, wherein the historical deadlock situation cause is such that the automated transportation vehicle will would be unable to interpret and solve the corresponding predicted future deadlock situation thereby indicating that the predicted future deadlock situation is insurmountable in autonomous mode and solving the corresponding predicted future deadlock situation would require additional information or instructions other than that available at the automated transportation vehicle; and in response to the prediction of the future deadlock situation, automatically offering a tele-operated mode of operation for the automated transportation vehicle, wherein the automated transportation vehicle is driven remotely to solve the predicted future deadlock situation, wherein the tele-operated mode of operation is automatically offered by the control module in response to receiving communication from a remote control center received via the one or more interfaces indicating the future deadlock situation prediction.

2. A transportation vehicle comprising the apparatus of claim 1.

3. A network entity comprising the apparatus of claim 1.

4. The apparatus of claim 1, wherein the historical context information comprises information on a spatial distribution seasonality of a historical deadlock situation cause.

5. The apparatus of claim 1, wherein the future deadlock situation cause is a traffic jam, wherein the information on the historical deadlock situation cause is an increased traffic density, wherein the historical context information comprises at least one element of the group comprising a rush hour daytime, a rush hour business day, and a rush hour holiday, and wherein the present context information comprises at least one element of the group comprising a present daytime, a date, and whether a day is a holiday.

6. The apparatus of claim 5, wherein the information indicative of the historical deadlock situation cause is a historical rush hour.

7. The apparatus of claim 1, wherein the cause of the predicted future deadlock situation is a street-blocking truck, wherein the information indicative of the historical deadlock situation cause is a moving activity, wherein the historical context information comprises at least one element of the group comprising seasonal moving activities, moving rates, and official road blocking authorizations for moving trucks.

8. The apparatus of claim 1, wherein the predicted future deadlock situation is caused by a street-blocking truck, wherein the information on the historical deadlock situation cause is goods delivery, wherein the historical context information comprises at least one element of the group comprising periodical delivery of goods, a delivery schedule of a truck, and a delivery schedule of a packet delivery service.

9. The apparatus of claim 8, wherein the information indicative for the historical deadlock situation cause is a delivery.

10. The apparatus of claim 1, wherein the predicted future deadlock situation is caused by a traffic jam, wherein the information on the historical deadlock situation cause is an increased traffic density, wherein the historical context information comprises an event schedule.

11. The apparatus of claim 10, wherein the event is a sports event, a music event, or a political event, and wherein the information indicative of the historical deadlock situation cause is an event.

12. The apparatus of claim 1, wherein the predicted future deadlock situation is caused by a false alarm indicating a detected object on the route of the automated transportation vehicle, wherein the information on the historical deadlock situation cause is a weather event, wherein the historical context information comprises at least one element of the group comprising historical weather data and a false detection rate based on weather events.

13. The apparatus of claim 12, wherein the weather event comprises wind speeds higher than a predefined threshold.

14. The apparatus of claim 1, wherein data used to perform prediction of the future deadlock situation is also used to schedule tele-operated driving resources associated with predicted future deadlock situations at the present location of the automated transportation vehicle.

15. A method for controlling a present mode of operation of an automated transportation vehicle based on prediction of a future deadlock situation for the automated transportation vehicle, wherein the predicted future deadlock situation is an exceptional traffic situation necessitating a change of the present operational mode for operation of the automate transportation vehicle from automated operation of the automated transportation vehicle to a tele-operated operation of the automated transportation vehicle from a control center, wherein the exceptional traffic situation would be insurmountable when in automated operation of the automated transportation vehicle, wherein the exceptional traffic situation would result from conditions resulting from the predicted future deadlock situation for the automated transportation vehicle, the method comprising:

obtaining information related to a historical deadlock situation cause in proximity to a present location of the automated transportation vehicle;

obtaining determined historical context information for the historical deadlock situation cause in proximity to the present location of the automated transportation vehicle;

obtaining determined information indicative of the historical deadlock situation cause based on the historical context information;

monitoring present context information for present information that corresponds to the determined information indicative of the historical deadlock situation cause at the present location of the automated transportation vehicle;

obtaining information including a predicted future deadlock situation based on the monitoring identifying a presence of present information that corresponds to the determined information indicative of the historical deadlock situation cause, wherein the historical deadlock situation cause is such that the automated transportation vehicle will be unable to interpret and solve the corresponding predicted future deadlock situation thereby indicating that the predicted future deadlock situation is insurmountable in autonomous mode and solving the corresponding predicted future deadlock situation would require additional information or instructions other than that available at the automated transportation vehicle; and in response to the prediction of the future deadlock situation, automatically offering a tele-operated mode of operation for the automated transportation vehicle, wherein the automated transportation vehicle is driven remotely to solve the predicted future deadlock situation, wherein the tele-operated mode of operation is automatically offered by the control module in response to receiving communication from a remote control center received via the one or more interfaces indicating the future deadlock situation prediction.

16. The method of claim 15, wherein the historical context information comprises information on a spatial distribution seasonality of a historical deadlock situation.

17. The method of claim 15, wherein the future deadlock situation cause is a traffic jam, wherein the information on the historical deadlock situation cause is an increased traffic density, wherein the historical context information comprises at least one element of the group comprising a rush hour daytime, a rush hour business day, and a rush hour holiday, and wherein the actual context information comprises at least one element of the group comprising an actual daytime, a date, and whether a day is a holiday.

18. The method of claim 17, wherein the information indicative of the historical deadlock situation cause is a historical rush hour.

19. The method of claim 15, wherein the cause of the predicted future deadlock situation is a street-blocking truck, wherein the information indicative of the historical deadlock situation cause is a moving activity, wherein the historical context information comprises at least one element of the group comprising seasonal moving activities, moving rates, and official road blocking authorizations for moving trucks.

20. The method of claim 15, wherein the predicted future deadlock situation is caused by a street-blocking truck, wherein the information on the historical deadlock situation cause is goods delivery, wherein the historical context information comprises at least one element of the group comprising periodical delivery of goods, a delivery schedule of a truck, and a delivery schedule of a packet delivery service.

21. The method of claim 20, wherein the information indicative for the historical deadlock situation cause is a delivery.

22. The method of claim 15, wherein the predicted future deadlock situation is caused by a traffic jam, wherein the information on the historical deadlock situation cause is an increased traffic density, wherein the historical context information comprises an event schedule.

23. The method of claim 22, wherein the event is a sports event, a music event, or a political event, and wherein the information indicative of the historical deadlock situation cause is an event.

24. The method of claim 15, wherein the predicted future deadlock situation is caused by a false alarm indicating a detected object on the route of the automated transportation vehicle, wherein the information on the historical deadlock situation cause is a weather event, wherein the historical context information comprises at least one element of the group comprising historical weather data and a false detection rate based on weather events.

25. The method of claim 24, wherein the weather event comprises wind speeds higher than a predefined threshold.

26. The method of claim 15, wherein data used to perform prediction of the future deadlock situation is also used to schedule tele-operated driving resources associated with predicted future deadlock situations at the present location of the automated transportation vehicle.

27. A non-transitory computer readable medium including a computer program having a program code for performing a method for controlling a present mode of operation of an automated transportation vehicle based on prediction of a future deadlock situation for the automated transportation vehicle, wherein the predicted future deadlock situation is an exceptional traffic situation necessitating a change of the present operational mode for operation of the automate transportation vehicle from automated operation of the automated transportation vehicle to a tele-operated operation of the automated transportation vehicle from a control center, wherein the exceptional traffic situation would be insurmountable when in automated operation of the automated transportation vehicle, wherein the exceptional traffic situation would result from conditions resulting from the predicted future deadlock situation for the automated transportation vehicle, when the computer program is executed on a computer, a processor, or a programmable hardware component, the method comprising:

obtaining information related to a historical deadlock situation cause in proximity to the present location of the automated transportation vehicle;

obtaining determined historical context information for the historical deadlock situation cause in proximity to the present location of the automated transportation vehicle;

obtaining determined information indicative of the historical deadlock situation cause based on the historical context information;

monitoring actual context information for present information that corresponds to the determined information indicative of the historical deadlock situation cause at the present location of the automated transportation vehicle;

obtaining information including a predicted future deadlock situation based on the monitoring identifying a presence of present information that corresponds to the determined information indicative of the historical deadlock situation cause, wherein the historical deadlock situation cause is such that the automated transportation vehicle will be unable to interpret and solve the corresponding predicted future deadlock situation thereby indicating that the predicted future deadlock situation is insurmountable in autonomous mode and solving the corresponding predicted future deadlock situation would require additional information or instructions other than that available at the automated transportation vehicle; and in response to the prediction of the future deadlock situation, automatically offering a tele-operated mode of operation for the automated transportation vehicle, wherein the automated transportation vehicle is driven remotely to solve the predicted future deadlock situation, wherein the tele-operated mode of operation is automatically offered by the control module in response to receiving communication from a remote control center received via the one or more interfaces indicating the future deadlock situation prediction.

28. The non-transitory computer readable medium of claim 27, wherein data used to perform prediction of the future deadlock situation is also used to schedule tele-operated driving resources associated with predicted future deadlock situations at the present location of the automated transportation vehicle.

* * * * *